UNITED STATES PATENT OFFICE.

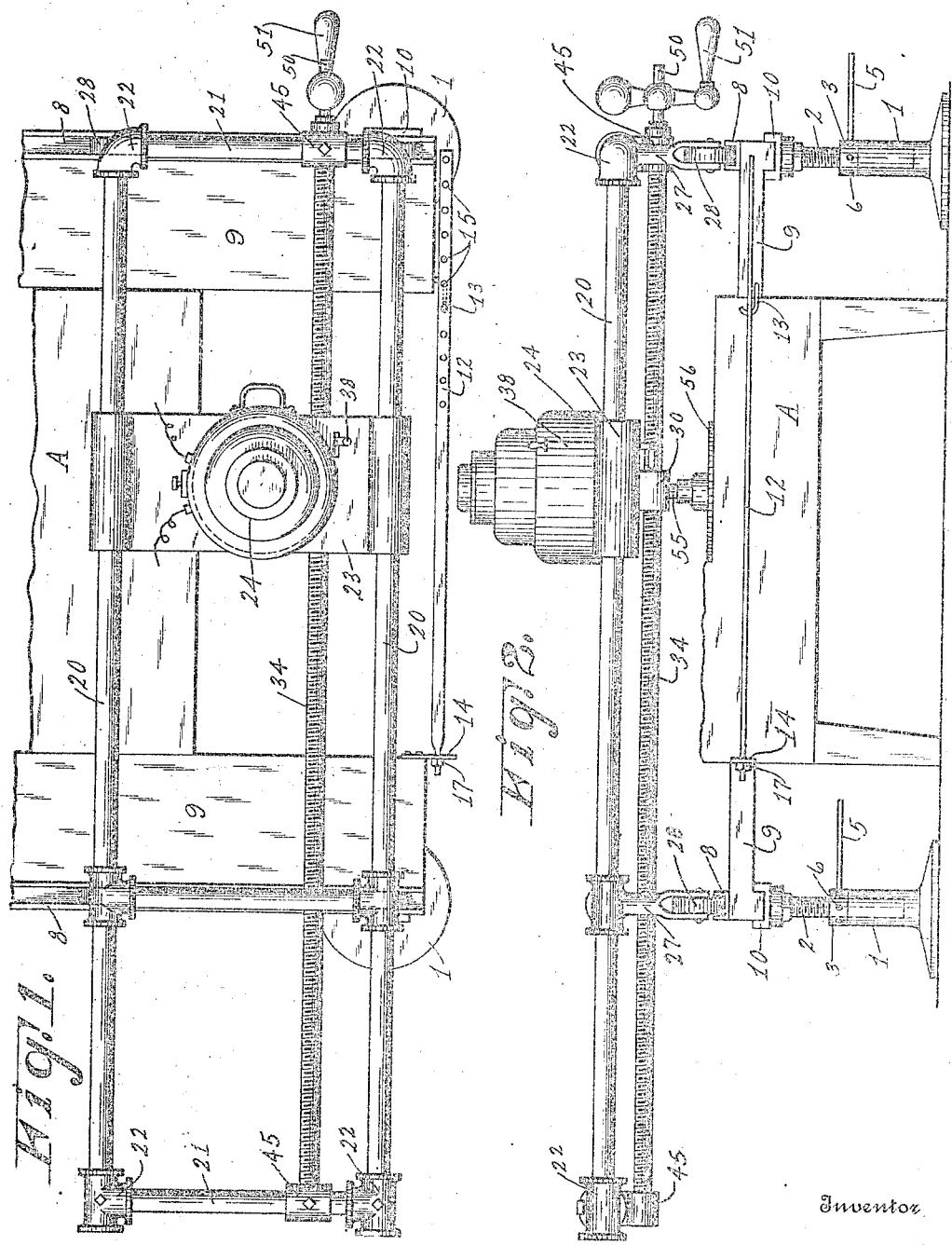

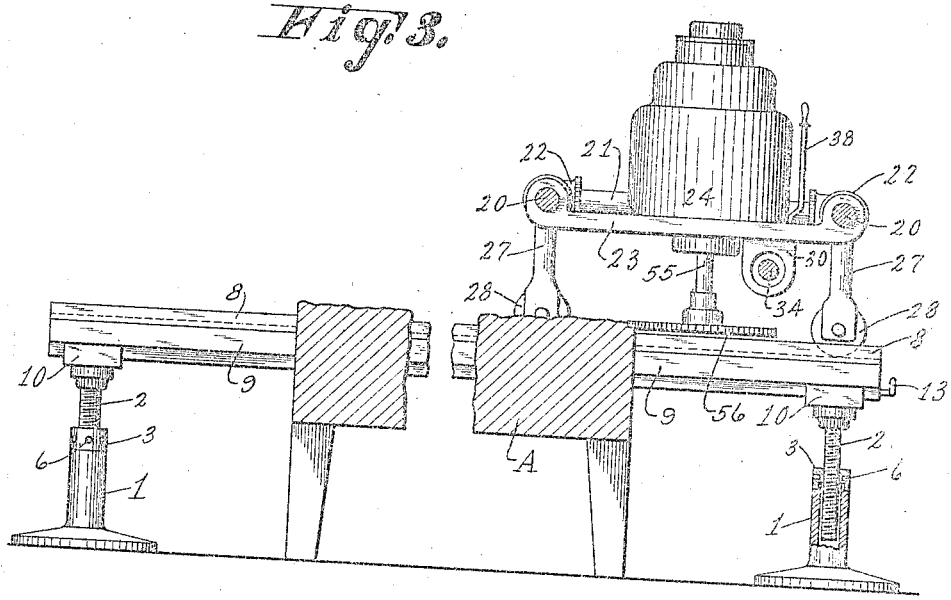
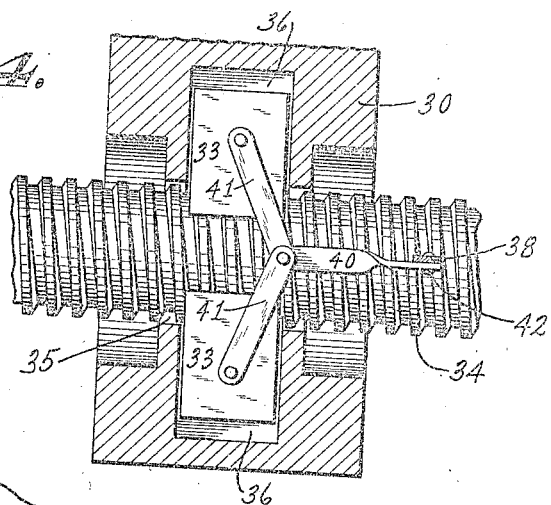

JACOB W. LEE, OF MILWAUKEE, WISCONSIN.

BLOCK SHAPING AND TRIMMING MACHINE.

1,231,625.

Specification of Letters Patent.

Patented July 3, 1917.

Application filed September 30, 1915. Serial No. 53,277.

*To all whom it may concern:*

Be it known that I, JACOB W. LEE, a citizen of the United States, residing at Milwaukee, county of Milwaukee, and State of Wisconsin, have invented new and useful Improvements in Block Shaping and Trimming Machines, of which the following is a specification.

My invention relates to improvements in block shaping and trimming machines. The object of my invention is to provide means for cutting across a block, such for example, as a butcher's block, in a horizontal plane with a view of removing the rough and uneven surfaces.

More specifically stated, the object of my invention is to provide means whereby an electrical motor may be directly connected with a horizontally disposed circular saw adapted to be reciprocated across the work to progressively remove the upper portion of the block by a succession of cuts or kerfs all in the same horizontal plane. The saw and the operating apparatus, including the driving mechanism and the feeding mechanism, being all supported independently of the block, whereby the apparatus is adapted to be quickly adjusted to and used for trimming and shaping blocks of differing sizes and at various heights or levels above the floor.

In the drawings:—

Figure 1 is a plan view of a shaping and trimming machine embodying my invention.

Fig. 2 is a side elevation of the same.

Fig. 3 is a central, vertical, longitudinal, sectional view showing the saw as it appears at the commencement of a cutting operation.

Fig. 4 is a detail view of the screw engaging clutch, whereby the motor and saw may be disengaged from the feed screw on the returning stroke.

Fig. 5 is a detail plan view showing a fragment of the saw and illustrating the form of the teeth.

Like parts are identified by the same reference characters throughout the several views.

A set of supporting tubular standards 1 are provided with extensible screw threaded sections 2 fitted to the rotatable nuts 3 mounted upon the upper ends of the standards 1, whereby the screw threaded extensions 2 may be raised or lowered in the standards. The nuts 3 may be rotated by suitable operating handles 5 adapted to be removably engaged in sockets 6 formed in the nuts.

The standards are connected in pairs by channel bars 8 and clamping plates 9; these clamping plates 9 being interposed between the channel bars 8 and suitable caps 10 at the upper ends of the extensible sections 2 of the standards. The clamping plates 9 are adapted to engage the work at their inner margins, two such clamping plates being assembled on opposite sides of the work and connected with each other by coupling rods 12. In the construction shown one of the clamping plates 9 is provided with hooks 13, the other is provided with projecting flanges 14 through which the coupling rod 12 may extend. Each coupling rod 12 is provided with a series of holes 15, in any one of which a hook 13 may be engaged after which the other end of the coupling rod may be inserted through the flange or arm 14 and drawn up by means of a nut 17 until the plates are securely bound upon the work consisting of the plate A.

It will be understood that two standards 1 with their extensions 2 are employed to support each clamping plate 9, and the superposed channel bar 8 in each case connects the two standards so that they may be manipulated as one member. Each pair of standards with the clamping plate and connecting channel bar, therefore, constitutes a supporting and clamping member adapted to coöperate with a similar member to engage the work, as illustrated.

The channel bars 9 constitute tracks for a superposed carriage comprising a frame composed of rods 20 connected at each end by cross rods 21 and elbowed couplings 22. The side rods or bars 20 of this frame are also connected by the motor supporting members 23 upon which an electric motor 24 is mounted. The motor supporting members 23, however, are adapted to slide longitudinally along the bars or rods 20 thereby permitting a traveling movement of the motor from one end of the carriage to the other. I therefore designate the member 23 as a traveler. The carriage is also provided with a set of legs 27 having rollers 28 at their lower ends adapted to travel in the channels of the channel bars 8, said channel bars being disposed with their side flanges projecting upwardly. It is, therefore, obvious that the carriage may be moved transversely along the tracks 8 while the motor may be moved longitudinally along the frame rods 20.

The motor supporting member or traveler 23 is provided with a hanger 30 suitably recessed to receive a set of adjustable half nuts 33 adapted to engage a feed screw 34 which extends through a central aperture 35 in the hanger. The recesses 36 which receive the nuts 33 are of sufficient size to permit a withdrawal of the nuts 33 from engagement with the threads of the screw 34. To move the nuts in and out of such engagement I employ a lever 38 which is pivotally connected with the traveler 23 and is also connected at its lower end with the nuts 33 by an arm 40 and a set of toggle links 41 each pivotally connected with one of the nuts 33 at one end and with the arm 40 of the lever at the other end. The arm 40 is preferably pivotally connected with the lower end of the lever, as illustrated at 41. With this construction when the lever is moved in one direction the toggle links 41 will push the nuts 33 outwardly to disengage from the screw 34, while a movement of the lever in the other direction will draw the nuts (or half nuts 33) inwardly to reëngage the screw nearer its respective ends.

The screw 34 is journaled in bearing members 45 suspended from the carrier frame. It is provided at one end with an extension 50 to which an operating handle 51 is secured, whereby the screw may be rotated. It is therefore obvious that when the half nuts 33 are in engagement with the screw 34 a rotation of the screw will move the traveler 23 and motor 24 longitudinally of the rods 20. This movement will be slow. If a quick movement of the motor is desired lever 38 will be actuated to disengage half nuts 33 from the screw, whereupon the traveler and the motor may be pushed manually along the rods 20 at any desired speed.

The motor shaft 55 extends vertically downwardly and at its lower ends is provided with a circular saw 56, the teeth of which are pitched in the direction that the saw is rotated by the motor. When the motor is in operation it may be adjusted to bring the saw into contact with the work by moving the traveler 23 along the rods 20 and also adjusting the motor supporting frame or carrier transversely along the tracks 8. When the saw is in contact with the work and the motor in operation the saw may be fed longitudinally through the work by turning the crank 51. The pitch of the teeth tends to cause the saw to draw into the work so that there will be no tendency to crowd the carrier laterally away from the material which the saw is cutting. The indrawing movement of the saw extends, of course, only to the center of the saw thus limiting the depth of the kerf cut by the saw in any one operation represented by the feeding of the motor along the screw 34 until the saw has cut entirely through the work. Lever 38 may then be operated to release the half nuts 33, whereupon the motor can be drawn back to its original position and the carrier then adjusted laterally a distance corresponding to the depth of the first cut. The motor will then be again fed to carry the saw across the work in the same horizontal plane and in a path parallel to the path taken by the saw in making the first cut.

I claim—

1. In a block shaping and trimming machine, the combination with a set of clamping plates adapted for edge contact with the block to be trimmed, of sets of vertical adjustable standards, each set adapted to support one of said plates, means for drawing the clamping plates and standards toward each other to bind the clamping plates upon the work, a set of tracks mounted upon the clamping plates, a carriage having a set of rollers adapted to run upon said tracks, said carriage being provided with frame rods extending transversely to the tracks and slidingly mounted with reference to one set of rollers, a traveler mounted to slide along said frame rods, a feed screw adapted to actuate said traveler, and a motor carried by the traveler and provided with a horizontally disposed circular saw operatively connected with the motor.

2. In a block shaping and trimming machine, the combination with a set of horizontally disposed clamping plates, each adapted for edge contact with the block to be trimmed, one of said plates being provided with hooks at each end thereof and the other of said plates being provided with an outwardly projecting flange at each end thereof, link rods, each adapted to be engaged with one of said hooks near one end and having its other end screw-threaded and adapted to project through an aperture in the outwardly projecting flange carried by the opposing clamping plate, clamping nuts adapted to engage the screw-threaded ends of the link rods to draw the clamping plates in clamping relation to the block to be trimmed, means for vertically adjusting the clamping plates, a carriage adapted to be supported from the clamping plates, a traveler mounted upon the carriage and adapted to be adjusted transversely to the line of movement of the carriage, a horizontally disposed saw supported from the traveler, and a motor mounted upon the traveler and operatively connected with the saw.

In testimony whereof I affix my signature in the presence of two witnesses.

JACOB W. LEE.

Witnesses:
LEVERETT C. WHEELER,
IRMA D. BREMER.